United States Patent [19]

Alfieri

[11] Patent Number: 5,223,671
[45] Date of Patent: Jun. 29, 1993

[54] MODULAR TERMINAL BOX FOR APPLICATION TO THE ELECTRIC MOTORS OF MOTORIZED VALVES

[75] Inventor: Giordano Alfieri, Parma, Italy

[73] Assignee: Biffi Italia S.R.L., Piacenza, Italy

[21] Appl. No.: 600,330

[22] Filed: Oct. 19, 1990

[30] Foreign Application Priority Data

Nov. 24, 1989 [IT] Italy .................. 28994/89[U]

[51] Int. Cl.⁵ ............... H05K 5/00; H02K 11/00; F16H 57/02
[52] U.S. Cl. ..................... 174/50; 361/394; 310/71; 310/83; 174/52.1; 74/606 R
[58] Field of Search ........... 74/606 R, 606 A, 607; 174/50, 52.1; 310/68 R, 71, 83; 361/335, 340, 392, 394

[56] References Cited

U.S. PATENT DOCUMENTS

| 4,322,703 | 3/1982 | Jackson et al. | 335/205 |
| 4,398,110 | 8/1983 | Flinchbaugh et al. | 310/83 |
| 4,577,127 | 3/1986 | Ferree et al. | 310/83 |
| 4,584,902 | 4/1986 | Fry | 74/606 R |
| 4,736,177 | 4/1988 | Vollmer et al. | 335/299 |

Primary Examiner—Leo P. Picard
Assistant Examiner—Bot Ledinh
Attorney, Agent, or Firm—Laff, Whitesel, Conte & Saret

[57] ABSTRACT

Intended for fitment to the electric motor of a motorized valve, the terminal box (1) is modular in design and can be utilized in different mounting positions to suit the direction from which power supply and control system wiring is routed to the valve.

1 Claim, 4 Drawing Sheets

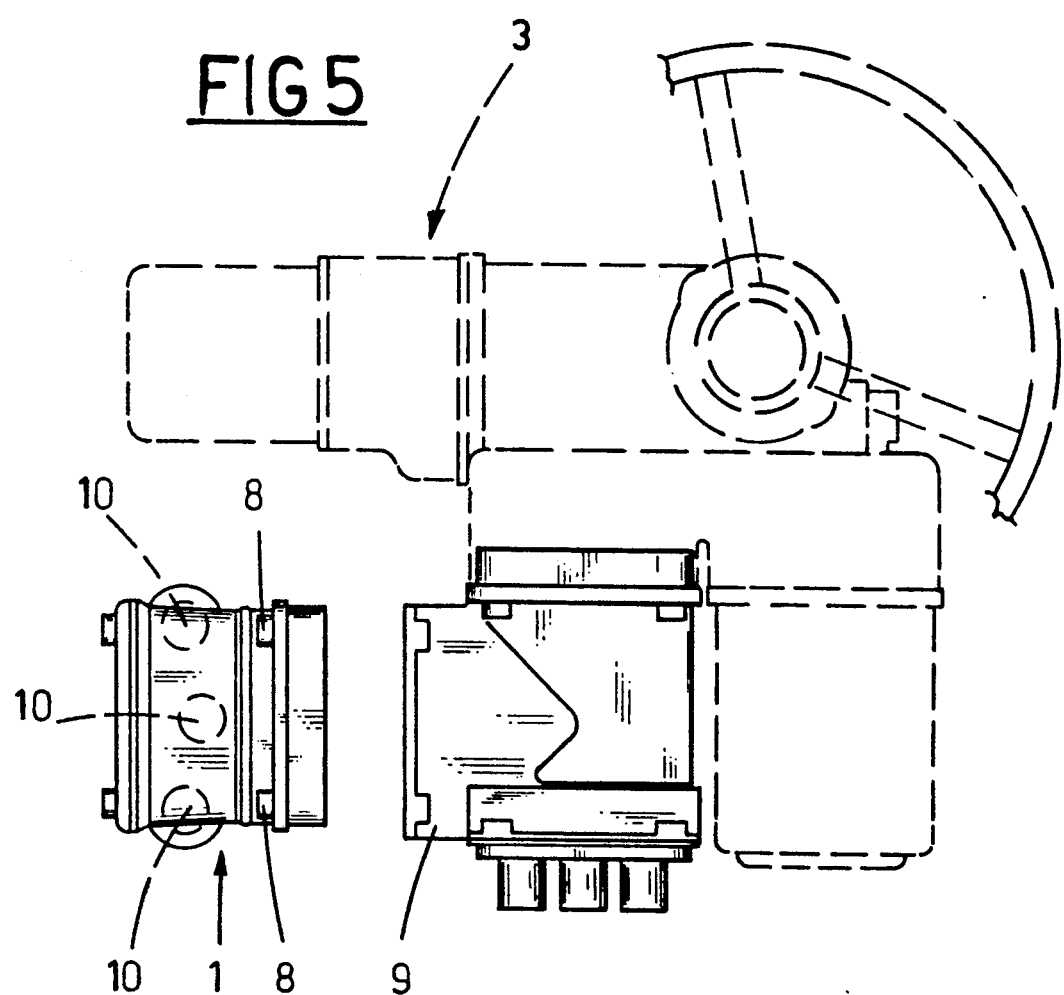

MODULAR TERMINAL BOX FOR APPLICATION TO THE ELECTRIC MOTORS OF MOTORIZED VALVES

BACKGROUND of the INVENTION

The present invention relates to a modular terminal box for application to the electric motors of motorized valves, and falls within the art field that embraces electric motors or actuators designed essentially for the purpose of opening and closing a valve.

Such valve actuators generally comprise control and monitoring components, and possibly a power system. The actuator may also incorporate a reversing unit, operated by remote control, which is effectively a switch control suitable for actuators coupled to three phase or single phase induction motors. The casing of this unit is mounted direct to the actuator.

The actuator also comprises a terminal box for its power and control wiring, to which both internal and external connections are made.

The terminal boxes of conventional actuators can be either connected direct to the actuator or fastened to the casing of the remote controlled reversing unit, and are embodied differently according to the option selected.

In particular, there are types of terminal box for direct mounting to the actuator, and other types fastening to and forming a single block with the casing of the remote controlled reversing unit. These conventional terminal boxes betray certain drawbacks: two types of box are required, one for each of the mounting arrangements referred to, and moreover, in the case of the box integrated with the remote controlled reversing unit, one has a situation whereby particular mounting positions of the actuator dictate a top or side cable entry into the box, bringing two negative consequences, namely the possibility of condensation dripping into the enclosure, and the difficulty of bending wires into certain positions.

The object of the present invention is to overcome the drawbacks outlined above, and in particular to provide a single terminal box of modular design such as can be utilized for both of the mounting arrangements described above, and which will also facilitate and optimize cable entry.

SUMMARY of the INVENTION

The stated objects are comprehensively realized in a modular terminal box according to the invention, which is designed for application to the electric motors of motorized valves and flanged in such a way as to afford a number of different mounting positions, whether secured directly to the valve actuator or fitted to the casing of the remote controlled reversing switch.

BRIEF DESCRIPTION OF THE DRAWINGS

The invention will now be described in detail, by way of example, with the aid of the accompanying drawings, in which:

FIG. 5 illustrates the terminal box mounted to a remote controlled reversing unit, viewed from above;

DESCRIPTION OF THE PREFERRED EMBODIMENTS

Figure 1:
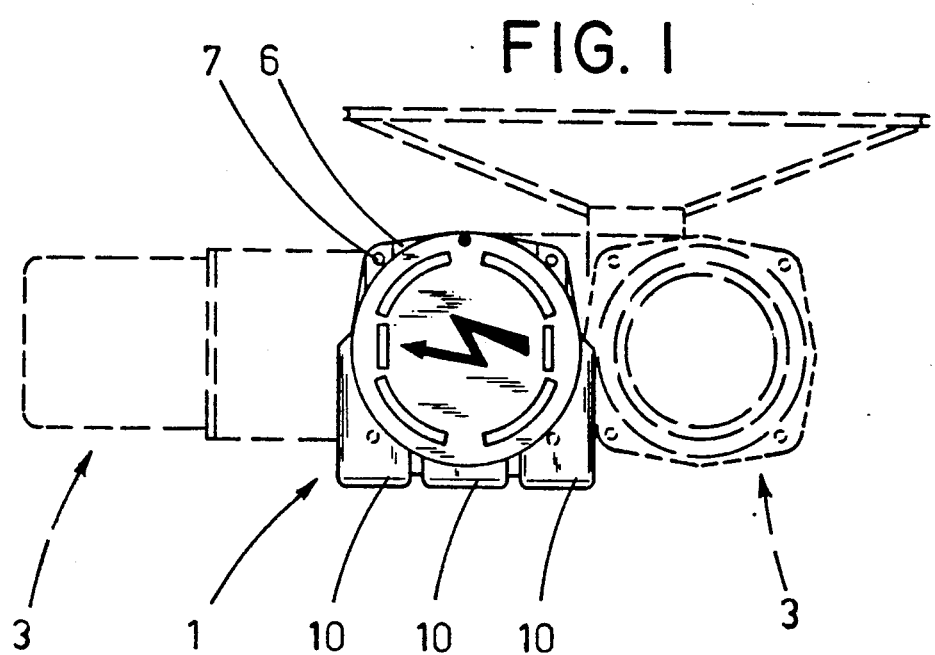
FIG. 1 illustrates the terminal box mounted direct to the valve actuator, viewed in side elevation.
Figure 3A:
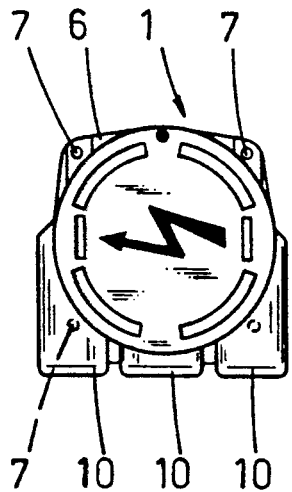
FIGS. 3a to 3b are each a side elevation illustrating the three possible positions of the terminal box when mounted directly to the valve actuator.
Figure 3B:
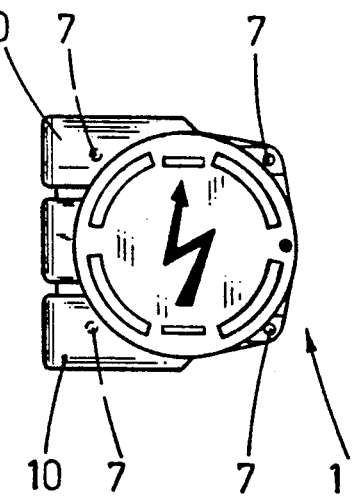
Figure 3C:
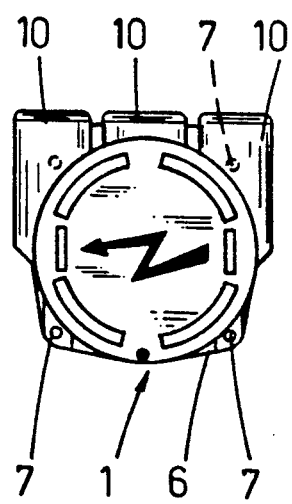
Figure 2:
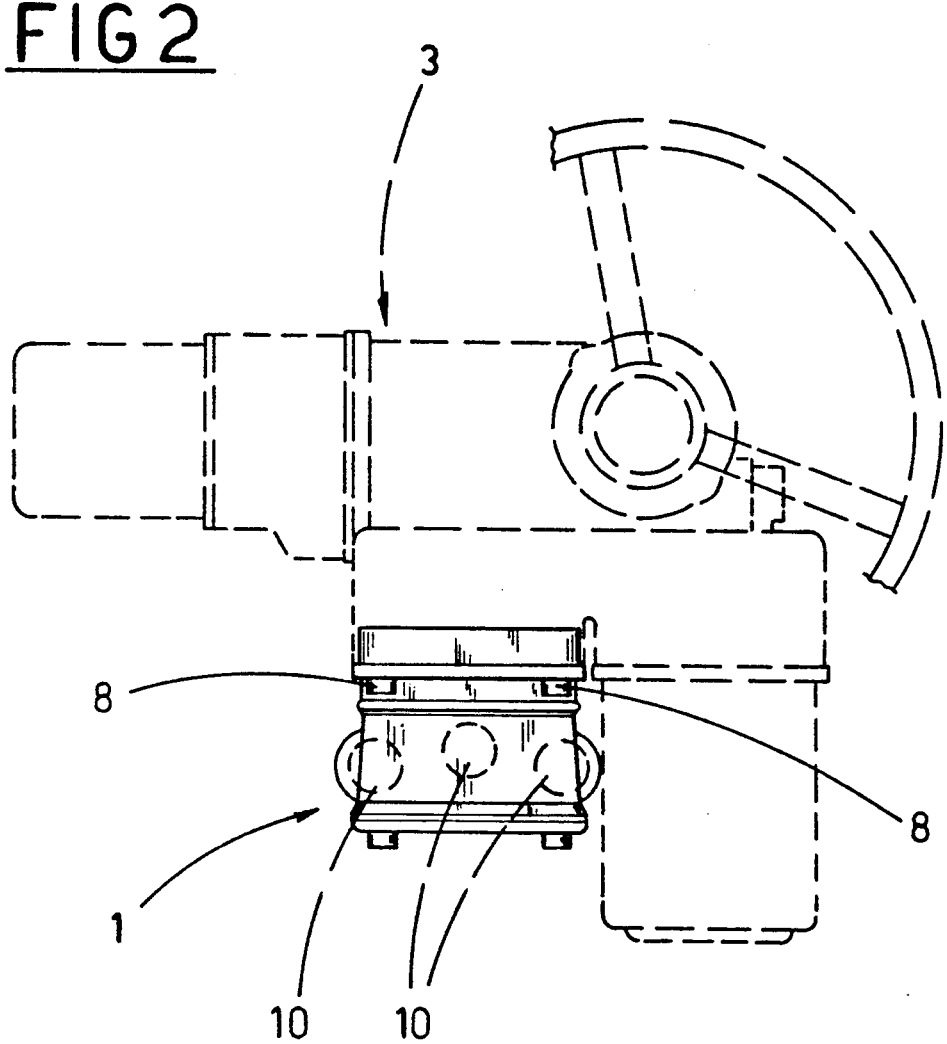
FIG. 2 illustrates the terminal box mounted direct to the valve actuator, viewed from above.

With reference to the drawings, 1 denotes a modular terminal box, in its entirety, for application to a valve actuator denoted 3.

The terminal box 1 is embodied with a flange 6 affording four holes 7 located one at each corner, set at 90° one from the next.

8 denotes one of four screws inserted through each hole 7 and into a corresponding threaded socket afforded either by the casing 9 of a reversing unit operated by remote control, or by the housing of the actuator 3.

Thus, in theory, the box can be mounted in any one of four positions each rotated 90° from the next.

Figure 4:
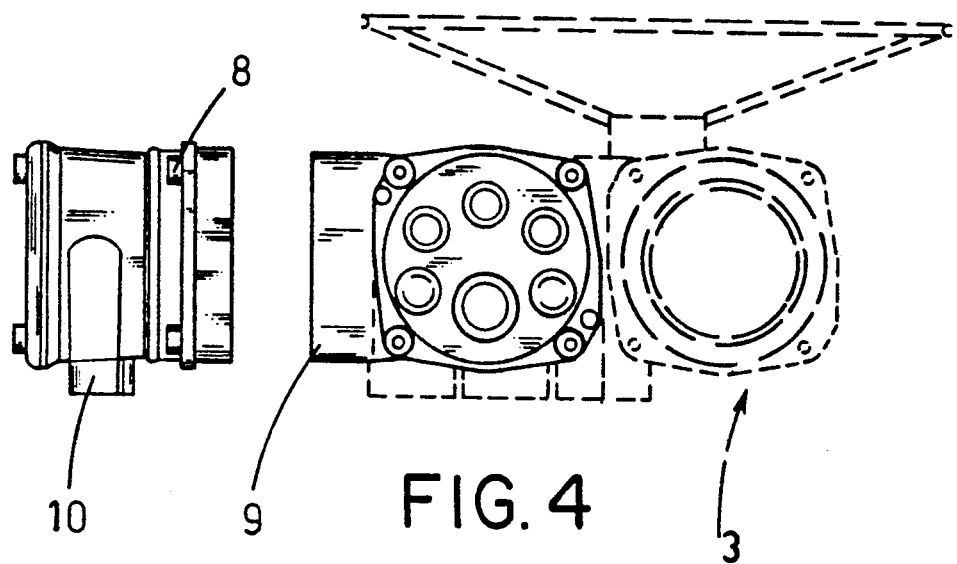
FIG. 4 illustrates the terminal box mounted to a remote controlled reversing unit, viewed in side elevation.
Figure 6A:
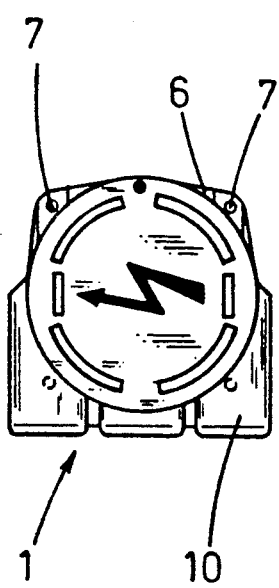
FIGS. 6a to 6c are each is a side elevation illustrating the three possible positions of the terminal box when mounted to a remote controlled reversing unit.
Figure 6B:
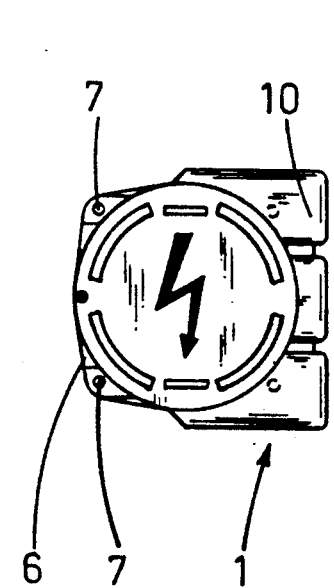
Figure 6C:
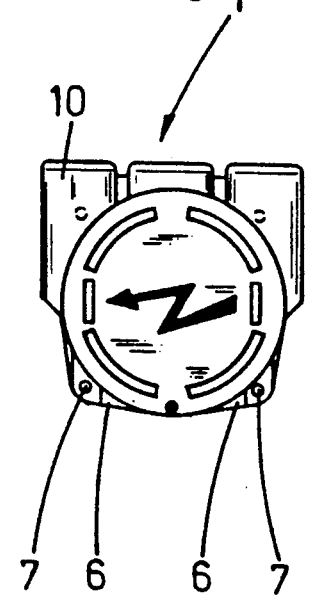

In reality however, only three mounting positions are available, one of the four being physically impracticable by reason of the fact that the power cables would strike against the actuator. Referring to FIG. 4, the casing 9 of the remote controlled reversing unit can be mounted to the actuator 3 in a position rotated anticlockwise through 90° from that illustrated, in such a way that the terminal box 1 is afforded a further four mounting positions, rotated 90° one from the next. The terminal box 1 also comprises three entry holes denoted 10, through which to route power supply and control signal cables (not illustrated). The foregoing description implies n limitation; for instance, the flange of the modular terminal box might be of substantially circular embodiment and provided with a greater number of holes than the four mentioned above, in such a way as to give more than four fixing options and a correspondingly greater number of mounting positions for the box than effectively described and illustrated herein.

What is claimed is:

1. A modular terminal box for a valve actuator comprising
   a box (1),
   said box having a plurality of cable inlets (10);
   said box having an integral flange (6),
   said flange having four holes (7) located at four corners with each hole distanced 90° from a next hole;
   said flange being sized to provide mounting of said box in more than one position on a casing of a valve actuator reversing unit, and
   screw fastening means (8) inserted through said flange holes (7) to fasten said terminal box in said more than one position.

* * * * *